United States Patent
Tanaka et al.

(10) Patent No.: US 7,291,574 B2
(45) Date of Patent: Nov. 6, 2007

(54) ZIRCONIA SINTERED BODY AND A METHOD FOR PRODUCING THE SAME

(75) Inventors: Ichiro Tanaka, Invercargill (NZ); Yoshio Uchida, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/785,084

(22) Filed: Feb. 25, 2004

(65) Prior Publication Data

US 2004/0192535 A1 Sep. 30, 2004

(30) Foreign Application Priority Data

Feb. 28, 2003 (JP) .............................. 2003-053083

(51) Int. Cl.
*C04B 35/488* (2006.01)
(52) U.S. Cl. ...................................... 501/105; 501/103
(58) Field of Classification Search ................ 501/103, 501/105
See application file for complete search history.

(56) References Cited

U.S. PATENT DOCUMENTS

| | | | | |
|---|---|---|---|---|
| 4,360,598 A | * | 11/1982 | Otagiri et al. | 501/103 |
| 4,370,393 A | * | 1/1983 | Watanabe et al. | 429/304 |
| 4,774,041 A | * | 9/1988 | Tsukuma et al. | 264/664 |
| 5,292,693 A | * | 3/1994 | Kaga et al. | 501/103 |
| 5,336,282 A | * | 8/1994 | Ghosh et al. | 51/309 |
| 5,928,977 A | * | 7/1999 | Magnin et al. | 501/87 |
| 6,905,993 B2 | * | 6/2005 | Sakuta et al. | 501/105 |
| 2002/0182141 A1 | * | 12/2002 | Uchida | 423/608 |

FOREIGN PATENT DOCUMENTS

| JP | 06009220 A | * | 1/1994 |
|---|---|---|---|
| JP | 08119730 A | * | 5/1996 |

OTHER PUBLICATIONS

Cullity, Elements of X-Ray Diffraction, pp. 100-106, 284-285.*
Patent Abstracts of Japan, JP-A 06-039303 published Feb. 15, 1994, to Shinagawa Refract. Co., Ltd.
Patent Abstracts of Japan, JP-A 06-056525 published Mar. 1, 1994, to Osaka Prefecture and Osaka Cement Co., Ltd.
Patent Abstracts of Japan, JP-A 2000-327416 published Nov. 28, 2000, to Toray Ind., Inc.

* cited by examiner

*Primary Examiner*—Karl Group
(74) *Attorney, Agent, or Firm*—Sughrue Mion Pllc.

(57) ABSTRACT

A zirconia sintered body having high strength and high toughness is provided, and a method for producing the same is also provided. The zirconia sintered body comprising tetragonal zirconia, wherein a full width at half maximum at (111) plane of the tetragonal zirconia obtained by X-ray diffraction pattern is from 0.38 to 4 degree. A method for producing the zirconia sintered body, wherein the method comprises steps of; molding zirconia powder having an average particle diameter of from 0.1 to 0.6 μm, a maximum particle diameter of 5 μm or less and a substantially polyhedral shape, and then sintering the molded green body under the temperature of from 1200 to 1400° C.

8 Claims, 2 Drawing Sheets

ZIRCONIA SINTERED BODY AND A METHOD FOR PRODUCING THE SAME

BACKGROUND OF THE INVENTION

1. Field of the Invention

The present invention relates to a zirconia sintered body having high strength and high toughness, and to a method for producing the same.

2. Description of Related Art

The zirconia sintered body is a kind of ceramics and used for a structural material such as pulverizing media, cutting tools, ferrules used as parts of optical fiber connection, and the like.

A zirconia powder, which is a raw material of the zirconia sintered body, is obtained by methods; for example, a method comprising steps of precipitating solid substance from an aqueous solution of zirconium compounds and then calcining the solid substance, or a method comprising steps of drying an aqueous solution of zirconium compounds by means of spray drying and then calcining the dried substance (Japanese Patent Application Laid-Open (JP-A) No. 2000-327416). By molding the zirconia powder, and then by sintering the molded green body, a zirconia sintered body is obtained.

However, conventional zirconia sintered bodies are not enough in viewpoint of strength and toughness. Therefore, more advanced zirconia sintered body is desired.

SUMMARY OF THE INVENTION

The object of the present invention is to provide a zirconia sintered body having high strength (for example, high bending strength) and high toughness, and a method for producing the same.

As a result of extensive investigation on zirconia sintered bodies, the inventors have been achieved the present invention.

The present invention provide a zirconia sintered body comprising tetragonal zirconia, wherein a full width at half maximum at (111) plane of the tetragonal zirconia obtained by X-ray diffraction pattern measured under following conditions is from 0.38 to 4 degree.

Conditions:
  Radiation Source: CuKα beam,
  Voltage·Amplitude: 40 kV×30 mA,
  Monochromator: Graphite,
  Divergence Slit: 1.0 degree,
  Scattering Slit: 1.0 degree,
  Detector Slit: 0.3 degree,
  Step Size: 0.2 degree,
  Time/step: continuous,
  Background Correction: made,
  Scan Speed: 0.4 degree/minute.

The present invention also provide a method for producing the zirconia sintered body, wherein the method comprises steps of; molding zirconia powder having an average particle diameter of from 0.1 to 0.6 μm, a maximum particle diameter of 5 μm or less and a substantially polyhedral shape, and then sintering the molded green body under the temperature of from 1200 to 1400° C.

DETAILED DESCRIPTION OF THE INVENTION

Figure 1:
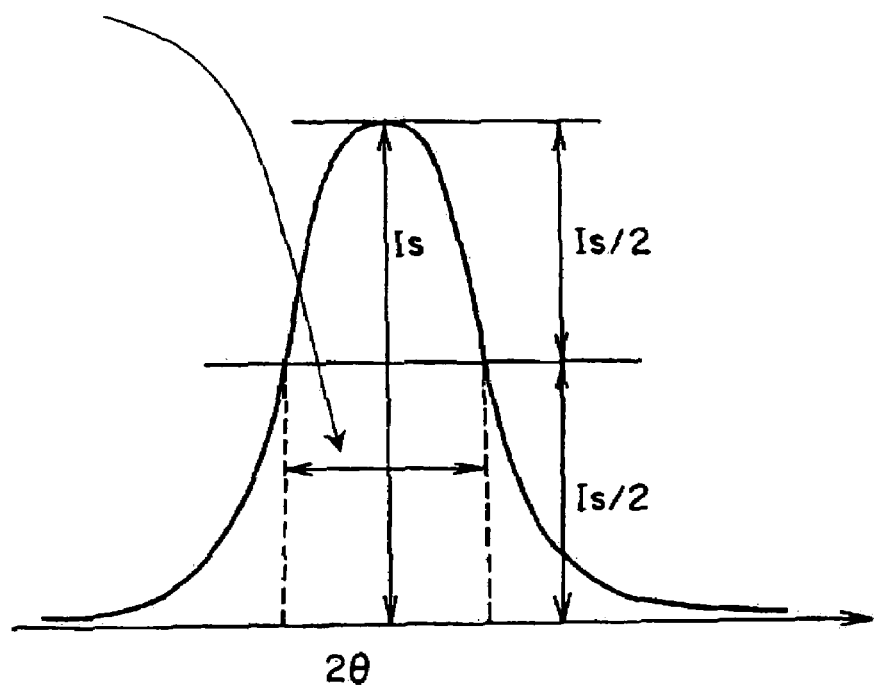
FIG. 1 shows the method to calculate the full width at half maximum.
Figure 2:
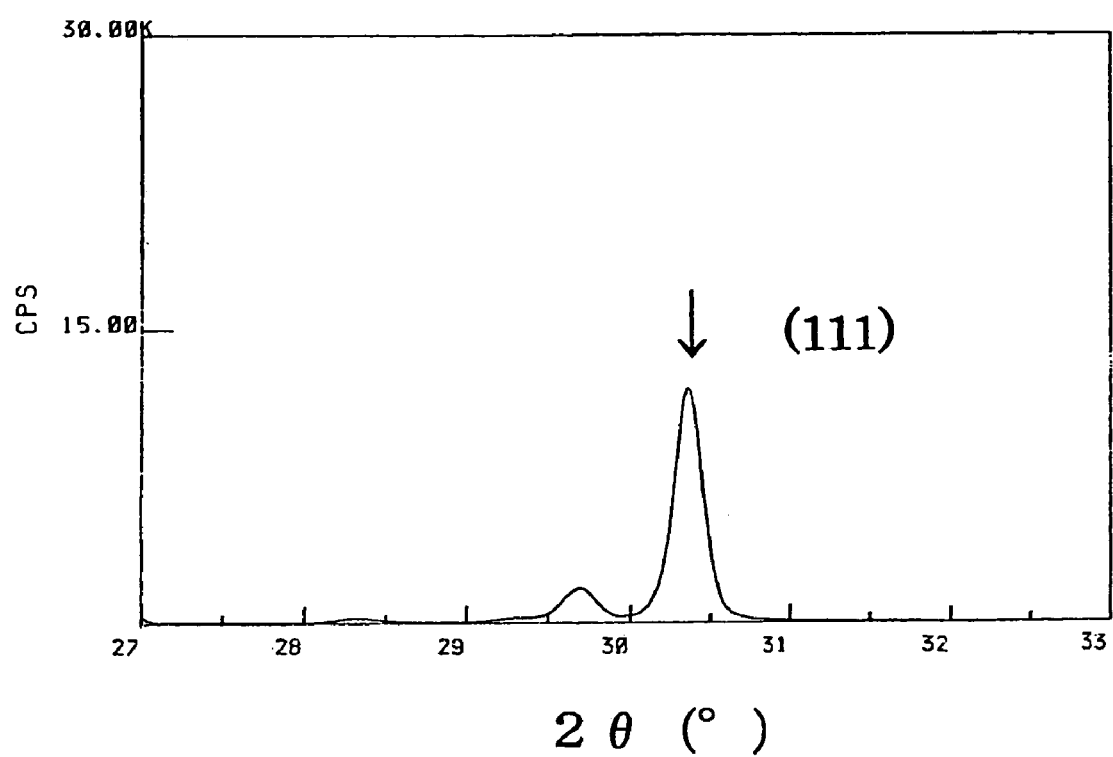
FIG. 2 shows the X-ray diffraction pattern of the zirconia sintered body obtained in Example 1.

The zirconia sintered body of the present invention comprising tetragonal zirconia. The full width at half maximum (hereinafter abbreviated to "FWHM") at (111) plane (usually, 2θ=around 30 degree) of the tetragonal zirconia obtained by X-ray diffraction pattern is 0.38 degree or more, preferably 0.4 degree or more, further preferably 0.41 degree or more, and 4 degree or less, preferably 2 degree or less, further preferably 1 degree or less.

The X-ray diffraction pattern is measured under following conditions;
  Radiation Source: CuKα beam,
  Voltage·Amplitude: 40 kV×30 mA,
  Monochromator: Graphite,
  Divergence Slit: 1.0 degree,
  Scattering Slit: 1.0 degree,
  Detector Slit: 0.3 degree,
  Step Size: 0.2 degree,
  Time/step: continuous,
  Background Correction: made,
  Scan Speed: 0.4 degree/minute.

It is preferable for the zirconia sintered body of the present invention that a ratio of tetragonal crystal in the zirconia sintered body is as high as possible. For example, the ratio is preferably 90% by volume or more. The ratio of tetragonal crystal is calculated from the X-ray diffraction peak intensity at (111) plane of tetragonal crystal lattice, and the intensities at (111) plane of monoclinic crystal lattice and at (11-1) plane of monoclinic crystal lattice.

The zirconia sintered body of the present invention is usually polycrystalline and usually has an average grain size of about 0.01 μm or more, preferably about 0.05 μm or more, and about 0.3 μm or less, preferably about 0.2 μm or less.

The zirconia sintered body of the present invention may contain a stabilizer. The stabilizer may be one that can make the tetragonal zirconia metastable at room temperature (for example, at 20° C.); such as $Y_2O_3$, $CeO_2$, MgO, CaO, $TiO_2$, $Yb_2O_3$, $Er_2O_3$, $Ho_2O_3$, and the like. An amount of the stabilizer in a sintered body is usually about 2% by weight or more and about 10% by weight or less. The zirconia sintered body of the present invention may contain $Al_2O_3$. An amount of $Al_2O_3$, if contained, is usually about 0.1% by weight or more and about 0.5% by weight or less. A density of the zirconia sintered body of the present invention is preferably 6 g/cm³ or more. The upper limit of density is theoretical density, that is, 6.1 g/cm³.

The zirconia sintered body of the present invention may be produced by a method comprising steps of, for example, molding zirconia powder and then sintering the molded green body.

A zirconia powder, which is a raw material of the zirconia sintered body of the present invention, is a compound represented by formula $ZrO_2$. An average particle diameter of the zirconia powder is about 0.1 μm or more and about 0.6 μm or less, and a maximum particle diameter is about 5 μm or less. The zirconia powder has substantially polyhedral shape. Furthermore, a ratio of monoclinic crystal in the zirconia powder is usually about 70% by volume or more, preferably about 80% by volume or more, further preferably about 90% by volume or more. BET specific surface area of the zirconia powder is about 10 m²/g or more, preferably about 15 m²/g or more, and about 30 m²/g or less, preferably about 20 m²/g or less.

The zirconia powder may contain above-mentioned stabilizer. An amount of the stabilizer in a sintered body is usually about 2% by weight or more and about 10% by weight or less per weight of finally to-be-obtained zirconia sintered body. The stabilizer may be, besides a metal oxide such as $Y_2O_3$, $CeO_2$, MgO, CaO, $TiO_2$, $Yb_2O_3$, $Er_2O_3$, $Ho_2O_3$, and the like, metal compounds which are convertible to such metal oxides during a sintering step mentioned hereinafter (as example of the metal compounds, metal hydroxide, metal chloride, metal nitrate, metal sulfate are indicated.).

The zirconia powder may be mixed with a sintering agent. The sintering agent includes aluminum oxide such as $Al_2O_3$, and aluminum compounds which are transformable to such aluminum oxide during a sintering step mentioned hereinafter (as example of the aluminum compounds, aluminum hydroxide, aluminum chloride, aluminum nitrate, aluminum sulfate are indicated.). The amount of sintering agent is usually about 0.1% by weight or more and about 10% by weight or less per weight of finally to-be-obtained zirconia sintered body.

Above mentioned zirconia powder, of which the average particle diameter and the maximum particle diameter respectively belong to above-described ranges and the powder shape is substantially polyhedral, maybe produced by a method comprising steps of, for example, pre-calcining zirconium oxychloride under the air at the temperature of 200° C. or more and less than 700° C., mixing appropriate stabilizer and sintering agent with the powder obtained by pre-calcining, and the calcining the mixture under a gas containing hydrogen chloride at the temperature of 700° C. or more and 1100° C. or less, and then pulverizing the calcined mixture.

The zirconia powder, which is a raw material of zirconia sintered body of the present invention, is usually granulated. Granulating may be achieved by using spray dryer, and the like. Specifically, the zirconia powder is mixed with water to form slurry, and the formed slurry is dried by spray drying at inlet temperature of 210-230° C., outlet temperature of 100-130° C. and in case of using a disk type spray dryer, at disk rotating speed of 5000-15000 rpm.

The zirconia powder or granule is molded. The molding may be achieved by known methods; for example, pressing (cold isostatic pressing, and the like), slip casting, tape casting, extruding or injecting. For molding, if necessary, a binder (an organic binder such as polyvinyl alcohol (PVA), and the like) is added to the zirconia powder. The green body obtained by molding the zirconia powder, if necessary, is heated at the temperature of 400° C. or more and 800° C. or less. By heating, the binder in the green body can be removed.

The green body obtained by molding the zirconia powder is sintered. The sintering temperature is usually about 1200° C. or more and 1400° C. or less. When the sintering temperature is lower, the density of the zirconia sintered body decreases. On the other hand, when the sintering temperature is higher, the average grain size becomes larger and a zirconia sintered body having high strength and high toughness can not be obtained. The sintering period is usually about 1 hour or more, within about 24 hours. The sintering may be achieved under oxidizing gas such as air, oxygen; inert gas such as nitrogen, argon or helium; reducing gas such as hydrogen; or mixture of oxidizing gas and inert gas, preferably under oxidizing gas, inert gas or mixture thereof. The total pressure of gas at sintering is atmospheric pressure (about 800 hPa or more and about 1200 hPa or less).

The zirconia sintered body of the present invention has high strength and high toughness. The zirconia sintered body of the present invention is also superior in water resistance. The zirconia sintered body is suitable to a structural material such as pulverizing media, cutting tools, ferrules used as parts of optical fiber connection, and the like.

EXAMPLE

The invention will now be described by the following examples. However, the present invention is not limited to those examples. The properties of zirconia powder and of zirconia sintered body were measured by following methods.

The Shape of Primary Particle:
  It was measured by using a scanning electron microscope (trade name "T-300", manufactured by JEOL. Ltd.) and a transmission electron microscope (trade name "TEMH9000NAR", manufactured by Hitachi, Ltd.).

The Average Particle Diameter D50 (μm), and the Maximum Particle Diameter D100 (μm):
  By using a particle size distribution analyzer (trade name "SALD2000A", manufactured by Shimadzu Corporation), a particle size distribution curve was drawn by plotting the accumulated weight of particles as ordinate and the particle size as abscissa. The particle size at which the accumulated weight becomes 50% by weight is named as D50, and the particle size at which the accumulated weight becomes 100% by weight is named as D100. About accumulated weight, the accumulated weight on ordinate of the particle size distribution curve is the value accumulating the weight of particles according to their size difference from smaller to larger.

BET Specific Surface Area (m²/g)
  It was measured by using a specific surface area analyzer (trade name "FLOWSORP 2300II", manufactured by Shimadzu Corporation).

Fracture Toughness (MPa·m$^{1/2}$):
  It was measured according to the industrial standard JIS-R-1601 by using Vickers hardness testing machine (trade name "AVK-C2", manufactured by Akashi Corporation).

Three-Point Bending Strength:
  It was measured according to JIS-R-1601.

Average Grain Size (μm):
  It was, by taking photograph of sintered body by using a scanning electron microscope, determined by a section method (linear intercept method).

Crystal Phase, and FWHM at (111) Plane of Tetragonal Zirconia:
  X-ray diffraction pattern was measured under the following conditions by using a X-ray diffractometer (trade name "RINT2500TTR", manufactured by Rigaku Corporation).

Conditions:
  Radiation Source: CuKα beam,
  Voltage·Amplitude: 40 kV×30 mA,
  Monochromator: Graphite
  Divergence Slit: 1.0 degree, Scattering Slit: 1.0 degree,
Detector Slit: 0.3 degree,
Step Size: 0.2 degree,
Time/step: continuous,
Background Correction: made,
Scan Speed: 0.4 degree/minute.

Then, ratios of tetragonal crystal and of monoclinic crystal were calculated according to following equations;

$$\text{The ratio of tetragonal crystal (\% by volume)} = \frac{It(111)}{Im(111) + Im(11-1) + It(111)} \times 100$$

$$\text{The ratio of monoclinic crystal (\% by volume)} = \frac{Im(111) + Im(11-1)}{Im(111) + Im(11-1) + It(111)} \times 100$$

where;
It(111): peak intensity at (111) plane of tetragonal zirconia,
Im(111): peak intensity at (111) plane of monoclinic zirconia,
Im(11-1): peak intensity at (11-1) plane of monoclinic zirconia.

And, from the X-ray diffraction pattern, as shown in FIG. 1, FWHM at (111) plane of tetragonal zirconia was measured.

Example 1

[Preparation of Zirconia Powder]

Zirconium oxychloride (manufactured by Wako Pure Chemical Industries, Ltd., Special grade chemical) was pre-calcined under the air at 600° C. for 3 hours. With 94.5 parts by weight of pre-calcined substance, 5.25 parts by weight of yttrium oxide ($Y_2O_3$, Average particle diameter: 0.4 µm, manufactured by Nippon Yttrium Co., Ltd.) and 0.25 parts by weight of alumina (trade name "AKP-30", manufactured by Sumitomo Chemical Co., Ltd.) were mixed, and the mixture was mixed for 6 hours by using ball mill. The mixture, under a gas (hydrogen chloride of 30% by volume, air of 70% by volume), was calcined at 1080° C. for 1 hour. Calcined powder was pulverized in a wet process by using ball mill, and then zirconia powder was obtained. The zirconia powder had polyhedral shape. The properties of the zirconia powder are shown in table 1.

[Production and Evaluation of Zirconia Sintered Body]

With 60 parts by weight of the zirconia powder, 40 parts by weight of water, and 1 part by weight of dispersant (trade name "SN5468", manufactured by Sannopco Ltd.) were mixed to form slurry. Then this slurry is granulated by using spray dryer (trade name "AN-40CR", manufactured by Ashizawa-Niro) under the conditions of inlet temperature of 220° C., outlet temperature of 110° C. and disk rotating speed of 10000 rpm, and then the granule having average particle diameter of 65 µm was obtained. The granule was molded by cold isostatic pressing (CIP) under the conditions of molding pressure of 1.5 t/cm$^2$ and of charged time of 180 seconds, and then molded green body was sintered under the air at 1350° C. for 3 hours. The properties of obtained zirconia sintered body are shown in Table 2.

Example 2

The zirconia powder was obtained in the same manner as in Example 1 except that alumina was not added in the procedure of [Preparation of zirconia powder] in Example 1. With the zirconia powder, a zirconia sintered body was produced in the same manner of [Producing and evaluating zirconia sintered body] in Example 1. The properties of the zirconia powder are shown in Table 1 and that of the zirconia sintered body are shown in Table 2.

Example 3

The zirconia powder was obtained in the same manner as in Example 1 except that calcination temperature was changed to 1000° C. in the procedure of [Preparation of zirconia powder] in Example 1. With the zirconia powder, a zirconia sintered body was produced in the same manner of [Production and evaluation of zirconia sintered body] in Example 1. The properties of the zirconia powder are shown in Table 1 and that of the zirconia sintered body are shown in Table 2.

Comparative Example 1

30% by weight aqueous solution of zirconium oxychloride (manufactured by Wako Pure Chemical Industries, Ltd., Special grade chemical) was heated at 80° C. for 30 hours to precipitate zirconium hydrate, and then the precipitated was filtrated. The precipitated was dried at 110° C. for 3 hours to obtain dried zirconium hydrate. With 94.5 parts by weight of this dried zirconium hydrate, 5.25 parts by weight of yttrium oxide ($Y_2O_3$, Average particle diameter: 0.4 µm, manufactured by Nippon Yttrium Co., Ltd.) and 0.25 parts by weight of alumina (trade name "AKP-30", manufactured by Sumitomo Chemical Co., Ltd.) were mixed, and the mixture was mixed for 6 hours by using ball mill. The mixture was calcined under the air at 1070° C. for 3 hours. Calcined powder was pulverized in a wet process by using ball mill, and then zirconia powder was obtained. The zirconia powder was not uniform and had no polyhedral shape.

With the zirconia powder, a zirconia sintered body was produced in the same manner of [Production and evaluation of zirconia sintered body] in Example 1. The properties of the zirconia powder are shown in Table 1 and that of the zirconia sintered body are shown in Table 2.

Comparative Example 2

30% by weight aqueous solution of zirconium oxychloride (manufactured by Wako Pure Chemical Industries, Ltd., Special grade chemical) and 10% by weight aqueous ammonia, which is two-time equivalent to the aqueous solution of zirconium oxychloride, were mixed to precipitate zirconium hydrate, and then the precipitate was filtrated. The precipitated was dried at 110° C. for 3 hours to obtain dried zirconium hydrate. With 94.5 parts by weight of this dried zirconium hydrate, 5.25 parts by weight of yttrium oxide ($Y_2O_3$, Average particle diameter: 0.4 µm, manufactured by Nippon Yttrium Co., Ltd.) and 0.25 parts by weight of alumina (trade name "AKP-30", manufactured by Sumitomo Chemical Co., Ltd.) were mixed, and the mixture was mixed for 6 hours by using ball mill. This mixture was calcined under the air at 1070° C. for 3 hours. The calcined powder was pulverized in a wet process by using ball mill, and then zirconia powder was obtained. The zirconia powder was not uniform and had no polyhedral shape. With the zirconia powder, a zirconia sintered body was produced in the same manner of [Production and evaluation of zirconia sintered body] in Example 1. The properties of the zirconia powder are shown in Table 1 and that of the zirconia sintered body are shown in Table 2.

TABLE 1

The properties of zirconia powder

|  | BET specific surface area (m²/g) | D50 (μm) | D100 (μm) | Ratio of monoclinic crystal (vol %) |
|---|---|---|---|---|
| Example 1 | 15.4 | 0.42 | 2 | 95 |
| Example 2 | 17.4 | 0.43 | 2 | 94 |
| Example 3 | 19.8 | 0.41 | 2 | 93 |
| Comparative example 1 | 15.6 | 0.75 | 10 | 25 |
| Comparative example 2 | 13.9 | 0.54 | 7 | 19 |

TABLE 2

The properties of zirconia sintered body

|  | FWHM (°) | Density (g/cm³) | Average grain size (μm) | Ratio of tetragonal crystal (vol %) | Toughness (MPa·m^{1/2}) | Bending Strength (kg/mm²) |
|---|---|---|---|---|---|---|
| Example 1 | 0.42 | 6.05 | 0.18 | 99 | 8.5 | 159 |
| Example 2 | 0.44 | 6.03 | 0.17 | 97 | 8.9 | 165 |
| Example 3 | 0.47 | 6.02 | 0.17 | 98 | 8.0 | 172 |
| Comparative example 1 | 0.33 | 6.05 | 0.25 | 99 | 5.7 | 130 |
| Comparative example 2 | 0.29 | 6.04 | 0.23 | 95 | 5.5 | 122 |

What is claimed is:

1. A zirconia sintered body comprising tetragonal zirconia, wherein a full width at half maximum at (111) plane of the tetragonal zirconia obtained by X-ray diffraction pattern measured under the following conditions is from 0.38 to 4 degrees having the following conditions:

| Radiation Source: | CuKα beam, |
|---|---|
| Voltage · Amplitude: | 40 kV × 30 mA, |
| Monochromator: | Graphite, |
| Divergence Slit: | 1.0 degree, |
| Scattering Slit: | 1.0 degree, |
| Detector Slit: | 0.3 degree, |
| Step Size: | 0.2 degree, |
| Time/step: | continuous |
| Background Correction: | made, |
| Scan Speed: | 0.4 degree/minute, and | wherein the zirconia sintered body contains $Al_2O_3$ and an amount of $Al_2O_3$ in the zirconia sintered body is about 0.5% by weight or less, and wherein the zirconia sintered body contains a stabilizer and an amount of the stabilizer in the zirconia sintered body is about 2% by weight or more and 5.25% by weight or less, and the stabilizer is at least one selected from the group consisting of $Y_2O_3$, $CeO_2$, $TiO_2$, $Yb_2O_3$, $Er_2O_3$, and $Ho_2O_3$, and wherein an average grain size of the zirconia sintered body is from 0.01 to 0.2 μm and a density of the zirconia sintered body is 6.00 g/cm³ or more.

2. The zirconia sintered body according to claim 1, wherein the full width at half maximum at (111) plane of the tetragonal zirconia is from 0.4 to 2 degrees.

3. The zirconia sintered body according to claim 1 or 2, wherein the full width at half maximum at (111) plane of the tetragonal zirconia is 1 degree or less.

4. The zirconia sintered body according to claim 1, wherein a ratio of the tetragonal zirconia in the zirconia sintered body is 90% by volume or more.

5. The zirconia sintered body according to claim 1, wherein the density of the zirconia sintered body is from 6 to 6.1 g/cm³.

6. A method for producing the zirconia sintered body, wherein the method comprises steps of
molding zirconia powder having an average particle diameter of from 0.1 to 0.6 μm, a maximum particle diameter of 5 μm or less and a substantially polyhedral shape, and then sintering the molded green body under the temperature of from 1200 to 1400° C.

7. The method according to claim 6, wherein the zirconia powder contains a monoclinic crystal.

8. The method according to claim 7, wherein a ratio of the monoclinic crystal in the zirconia powder is 70% by volume or more.

* * * * *